United States Patent [19]

Inoue et al.

[11] Patent Number: 5,155,607
[45] Date of Patent: Oct. 13, 1992

[54] OPTICAL MODULATION DISPLAY DEVICE AND DISPLAY METHOD USING THE SAME

[75] Inventors: Akinori Inoue; Ryojiro Akashi; Yutaka Akasaki, all of Kanagawa, Japan

[73] Assignee: Fuji Xerox Co., Ltd., Tokyo, Japan

[21] Appl. No.: 670,762

[22] Filed: Mar. 15, 1991

[30] Foreign Application Priority Data

Mar. 16, 1990 [JP] Japan .................................. 2-67981

[51] Int. Cl.⁵ .................................................. G02F 1/13
[52] U.S. Cl. .................................... 359/51; 359/96; 359/52
[58] Field of Search ............... 350/349, 351, 331 R; 359/51, 52, 96, 97, 99

[56] References Cited

U.S. PATENT DOCUMENTS

| | | | |
|---|---|---|---|
| 3,697,297 | 10/1972 | Churchill et al. | 350/351 |
| 3,734,597 | 5/1973 | Churchill et al. | 350/351 |
| 4,435,047 | 3/1984 | Fergason | 359/51 |
| 4,525,032 | 6/1985 | Hilsum | 350/331 R |
| 4,556,289 | 12/1985 | Fergason | 350/349 |
| 4,616,903 | 10/1986 | Fergason | 359/51 |
| 4,688,900 | 8/1987 | Doane et al. | 350/351 X |
| 4,765,719 | 8/1988 | Fergason | 350/347 V |
| 5,018,840 | 5/1991 | Ogawa | 350/349 |
| 5,024,784 | 6/1991 | Eich et al. | 350/349 X |

FOREIGN PATENT DOCUMENTS

90/04805  5/1990  PCT Int'l Appl. .................. 350/349

Primary Examiner—Stanley D. Miller
Assistant Examiner—Huy K. Mai
Attorney, Agent, or Firm—Finnegan, Henderson, Farabow, Garrett and Dunner

[57] ABSTRACT

An optical modulation display device is disclosed, comprising a polymer matrix having dispersed therein a liquid crystal composition containing a photochromic compound as a constituting component, or comprising a photochromic polymer matrix having dispersed therein a liquid crystal composition. The display device provides a wide area and flexible display which can be driven without using a matrix addressing system.

17 Claims, 9 Drawing Sheets

OPTICAL MODULATION DISPLAY DEVICE AND DISPLAY METHOD USING THE SAME

FIELD OF THE INVENTION

This invention relates to a photochromic composition for a display and, more particularly to a photochromic composition for use in a display which comprises a liquid crystal dispersed in a polymer matrix and undergoes phase change due to photochromism and a display device using the composition, and to a method for displaying utilizing the display device.

BACKGROUND OF THE INVENTION

A display device of sheet form prepared by dispersing a nematic liquid crystal or a mixture of a nematic liquid crystal and a cholesteric liquid crystal in a polymer in the form of an emulsion in a phase separation state or dispersing microcapsules of the liquid crystal in a polymer is known as disclosed in U.S. Pat. Nos. 4,435,047 and 4,616,903.

These display devices are expected to be driven by applying a voltage as in conventional liquid crystal displays and, therefore, require matrix addressing for making a display.

Establishment of a matrix addressing system requires a circuit and electrodes, which makes it impossible to produce a flexible display. Moreover, a matrix addressing system is disadvantageous in that only one defect leads to a failure of displaying, making it difficult to produce a display of wide area.

SUMMARY OF THE INVENTION

An object of the present invention is to provide a display device which overcomes the above-described difficulties associated with conventional displays driven by electrical field application, making it feasible to produce a wide area display and a flexible display, such as a white board-like display, a desk mat-like display, a re-writable OHP sheet, or a re-writable paper-like display.

Another object to the present invention is to provide a method for displaying utilizing the display device.

The above objects of the present invention is accomplished by an optical modulation display device comprising a polymer matrix having dispersed therein a liquid crystal composition containing a photochromic compound as a constituting component, or an optical modulation display device comprising a polymer matrix having photochromics having dispersed therein a liquid crystal composition, and a method for displaying utilizing said display device.

The terminology "photochromic compound" as used herein means a compound which undergoes a physical change, for example, in molecular structure or absorption spectrum upon light absorption.

Figure 1:
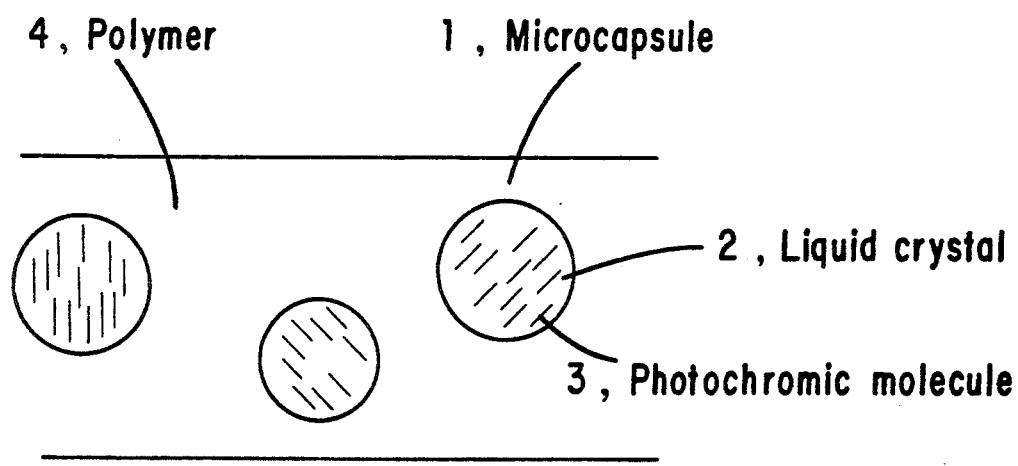
FIGS. 1 to 3 each show a display device according to the present invention.

In these figures, numerals have the following meaning.

1 ... Capsule
2 ... Liquid crystal
3 ... Photochromic compound
4 ... Polymer
5 ... Photochromic liquid crystal

DETAILED DESCRIPTION OF THE INVENTION

The photochromic compounds which can be used in the present invention include those described in Heintz Dürr and Henri Bouas-Laurent ed., *PHOTOCHROMISM, Molecules and Systems* (1900). Among these photochromic compounds, preferred are those which undergo a great structural change, such as azobenzene compounds, spiropyran compounds, spirooxazine compounds, triarylmethane compounds, flugide compounds, stilbene compounds, and indigo compounds, and polycyclic aromatic compounds, viologen compounds, and diarylethene compounds.

Specific examples of the photochromic compounds are shown below:

Azobenzene compound

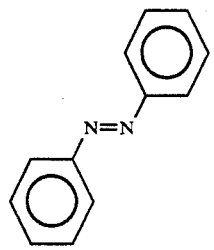

Spiropyran compound

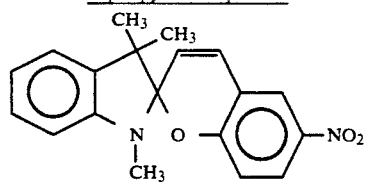

Spirooxazine compounds

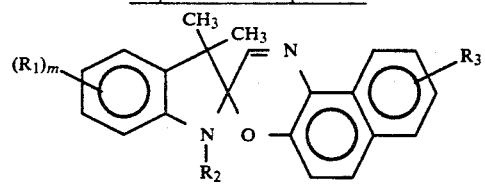

$R_1$ = —H, a halogen atom, —OCH$_3$, or —CF$_3$.
$R_2$ = —(CH$_2$CH$_2$O)$_n$R, in which n is an integer of from 1 to 10 and R is an alkyl group having 1 to 10 carbon atoms, an alkyl group having 1 to 30 carbon atoms,

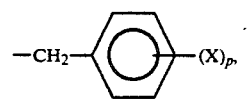

in which p is 1, 2, 3, 4, or 5, or

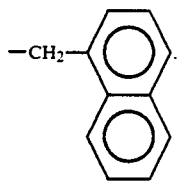
$R_3 = -OCH_3$, or $-OH$.
$m = 1, 2, 3,$ or $4$.
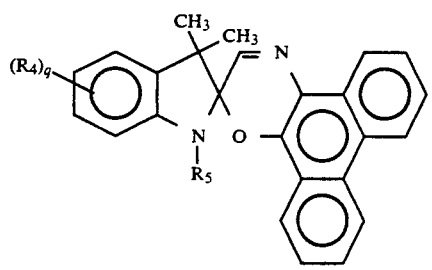
$R_4 = -H$, or a halogen atom.
$R_5 = -CH_3$,
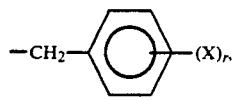
in which r is 1, 2, 3, 4, or 5, or
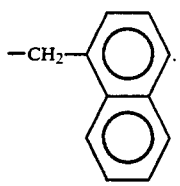
$q = 1, 2, 3,$ or $4$.
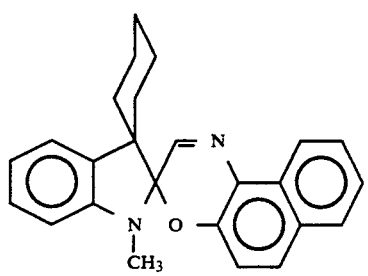
-continued
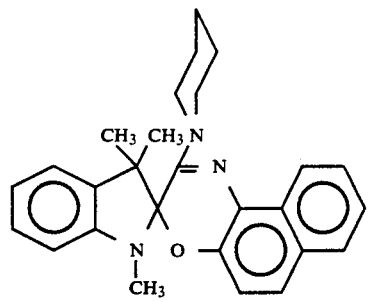
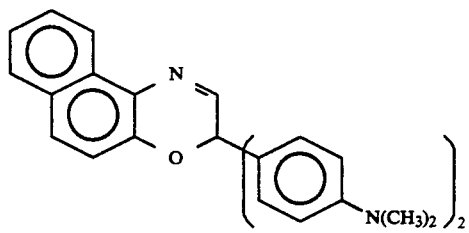
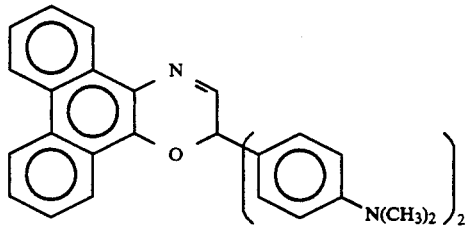
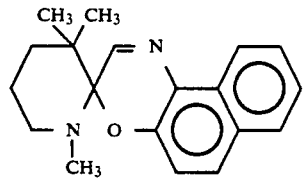
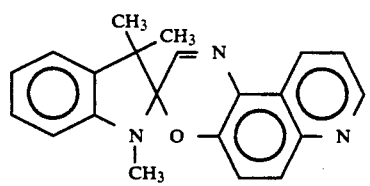
Triarylmethane compounds
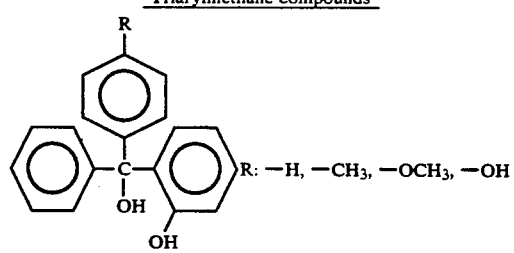
R: $-H, -CH_3, -OCH_3, -OH$
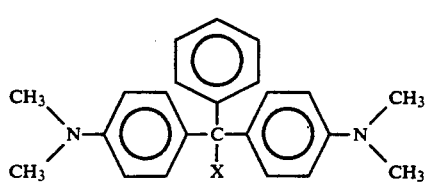
X: $-H, -CH_3, -OCH_3, -OH$ Flugide compound

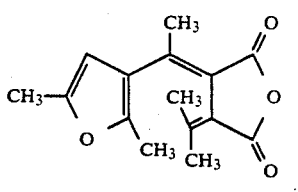

Stilbene compound

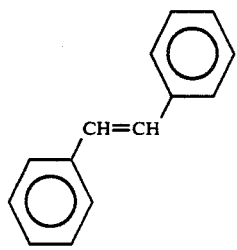

Indigo compound

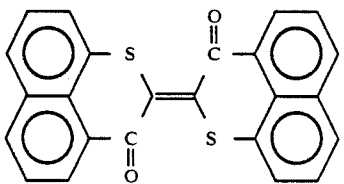

Polycyclic aromatic compounds

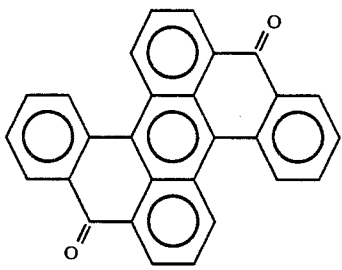

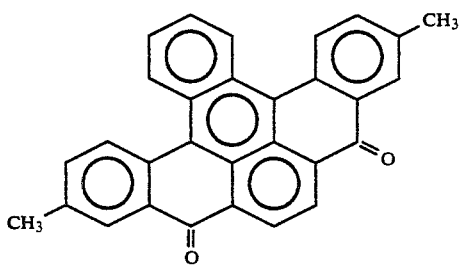

Viologen compound

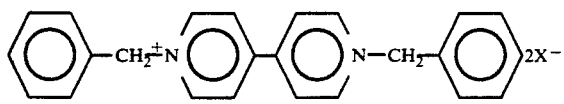

Diarylethene compound

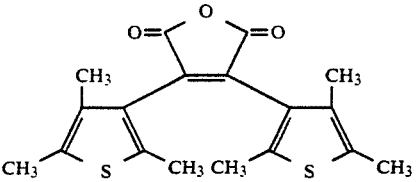

The display device of the present invention can be obtained by (1) a method of dispersing a liquid crystal composition containing a photochromic compound as a constituting component in a polymer matrix, or (2) a method of dispersing a liquid crystal composition in a photochromic polymer matrix having photochromic properties.

Method (1) includes (1') a method of mixing a photochromic compound with a liquid molecule and (1") a method of using a photochromic liquid crystal.

In method (1'), various known liquid crystal compounds can be mixed with a photochromic compound which is preferably selected so as to have good miscibility with the selected liquid crystal compound. Examples of the liquid crystal compounds include bisphenol compounds, phenyl benzoate compounds, cyclohexylbenzene compounds, azoxybenzene compounds, azobenzene compounds, azomethine compounds, terphenyl compounds, biphenyl benzoate compounds, cyclohexylbiphenyl compounds, phenylpyrimidine compounds, cyclohexylpyrimidine compounds, and cholesterol compounds. The amount of the photochromic compound to be mixed is appropriately selected from a range of from 0.01 to 50% by weight, and preferably of from 1 to 20% by weight.

Examples of photochromic liquid crystal compounds which can be used in method (1") include azobenzene liquid crystal compounds whose typical structural formula is shown below.

$$R-\bigcirc-N=N-\bigcirc-X$$

wherein R represents an alkyl group having 1 to 30 carbon atoms or an alkoxy group having 1 to 10 carbon atoms; and X represents a halogen atom, a cyano group, or an alkoxy group having 1 to 10 carbon atoms.

Figure 9:
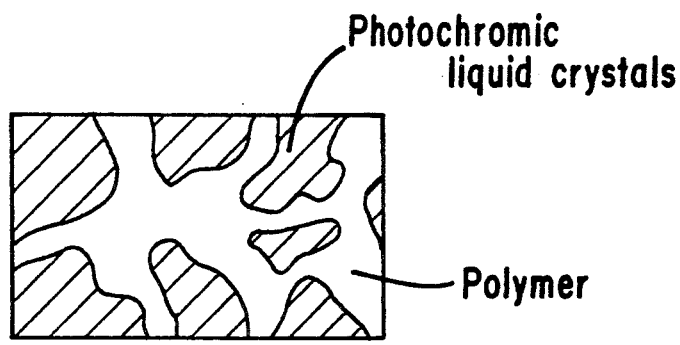
FIGS. 9, 10 and 11 each show a typical mode of the liquid crystal composition containing a photochromic compound according to the present invention.

The thus obtained liquid crystal composition containing a photochromic compound as a constituting component and a polymer immiscible with the liquid crystal composition are introduced into a common solvent, and the resulting solution is coated on an appropriate substrate and dried to obtain an optical modulation display device. In this method, the optical display device has phase separation structure in which the liquid crystal composition having photochromic properties and the polymer are present in separate phases (FIG. 9).

Figure 10:
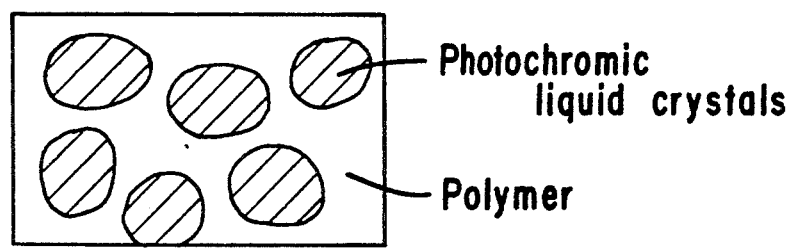

Further, when a water-soluble polymer such as polyvinyl alcohol (PVA), cellulose, or polyvinyl pyrrolidone (PVP) is used as the dispersant, the liquid crystal composition having photochromic properties is dispersed in the polymer matrix wall in a spherical capsule form (FIG. 10). In this case, the capsule may be prepared by pre-encapsulating the liquid crystal composition by using water-soluble polymer, and dispersing the obtained capsule particles into other polymers.

Figure 11:
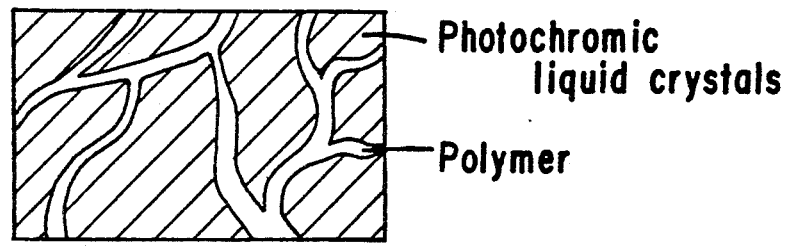

If the amount of polymer as the dispersant is relatively small as compared with the liquid crystal composition, the display device may have phase separation structure in a polymer network form, as shown in FIG. 11.

In method (2), a photochromic compound is bound to a water-soluble polymer such as PVA, cellulose, and PVP to obtain a photochromic polymer matrix. As the means of binding, a copolymerization of a monomer component and a photochromic compound, a substitution or addition reaction to a polymer can be utilized.

The thus obtained photochromic polymer is dissolved in water, and the solution is mixed with an organic solvent solution of the liquid crystal compound miscible with the above described photochromic compound. If necessary, a surfactant such as sodium dodecylsulfate is added to the mixed solution. Then, the mixed solution is stirred at a high speed, thereby obtaining a so-called capsule type emulsion in which a liquid crystal compound is dispersed in the photochromic polymer. Further, it is possible to control the particle size of capsule particles by using an emulsifier. The above emulsion is coated on an appropriate substrate to obtain an optical modulation display device of capsule structure in which liquid crystal molecules are dispersed in water-soluble polymer. In this case, the water-soluble polymer itself functions as a polymer matrix. Further, a binder component, e.g., a latex, may be added to the emulsion in order to improve film forming properties. Since the dispersed liquid crystals and the photochromic molecules which are bound to polymer have high miscibility, the photochromic molecules become to exist in the liquid crystal side. Therefore, the liquid crystal molecules and the photochromic molecules are present in a polymer matrix in capsule structure.

The optical modulation display devices produced by the above-described methods can control the alignment of liquid crystals due to the occurrence of structural change of the photochromic molecule at light irradiation.

A structure nd working mechanism of a display device using the optical modulation display composition according to the present invention will be explained below.

Figure 2:
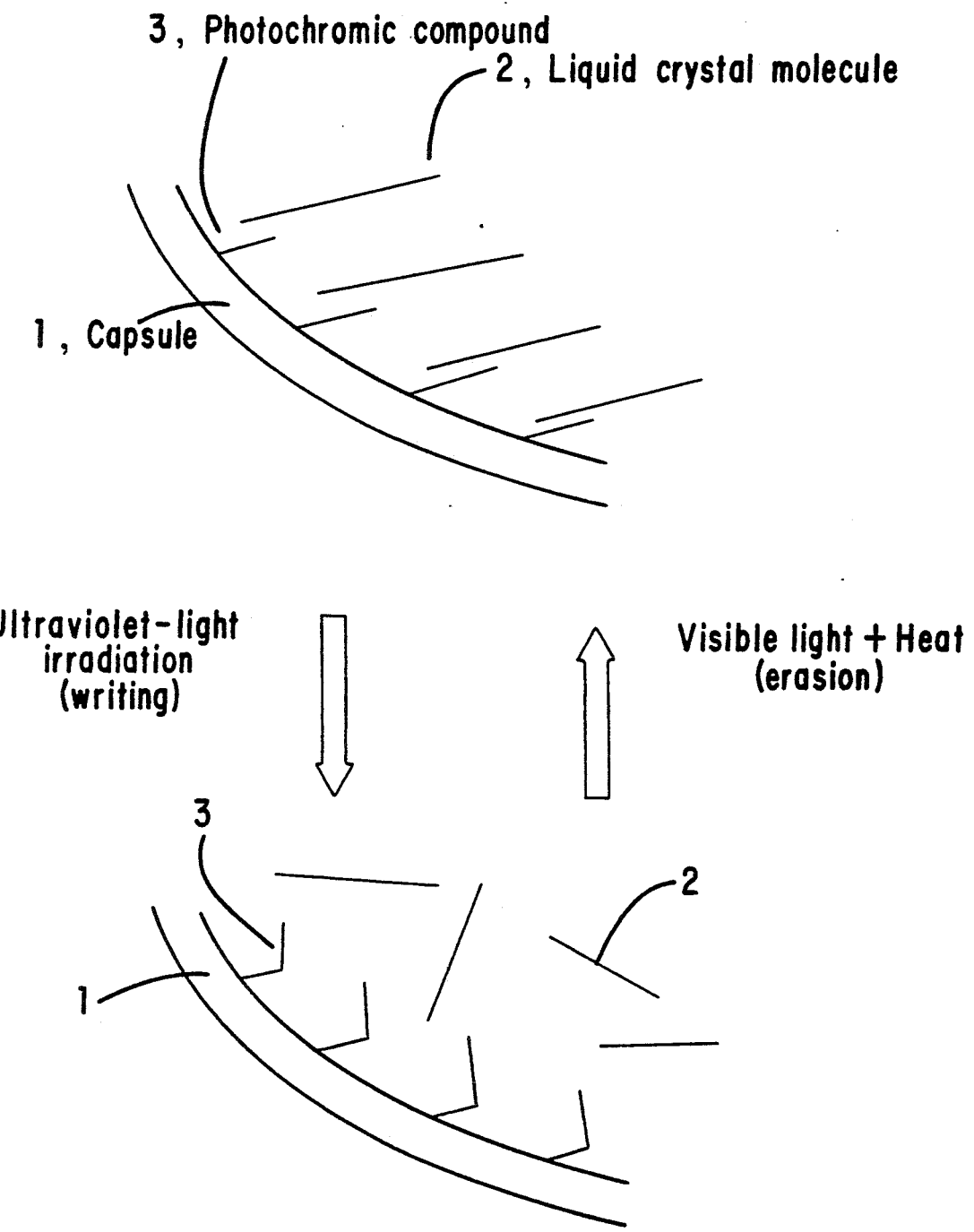
Figure 3:
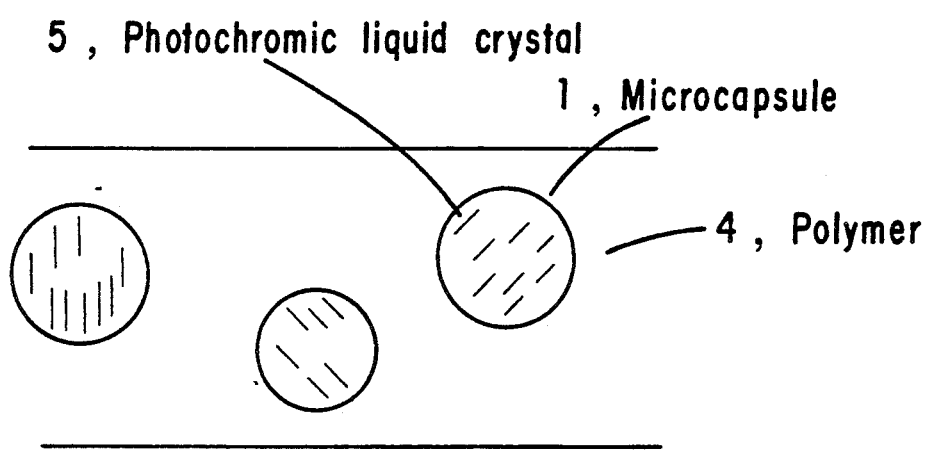

FIGS. 1 through 3 each illustrate an optical modulation display device having a liquid crystal-dispersed polymer structure. In FIG. 1, a photochromic compound and a liquid crystal molecule are mixed according to method (1'). In FIG. 2, a photochromic compound is bound to a polymer according to method (2). In FIG. 3, a photochromic liquid crystal is dispersed in a polymer according to method (1").

Figure 4A:
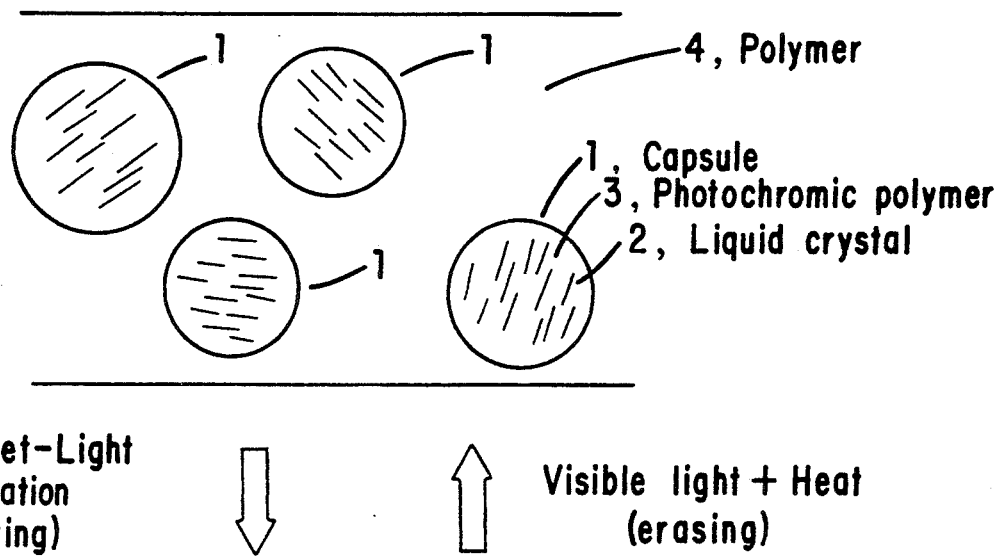
FIG. 4(A-B) shows a working mechanism of the display device according to the present invention.
Figure 4B:
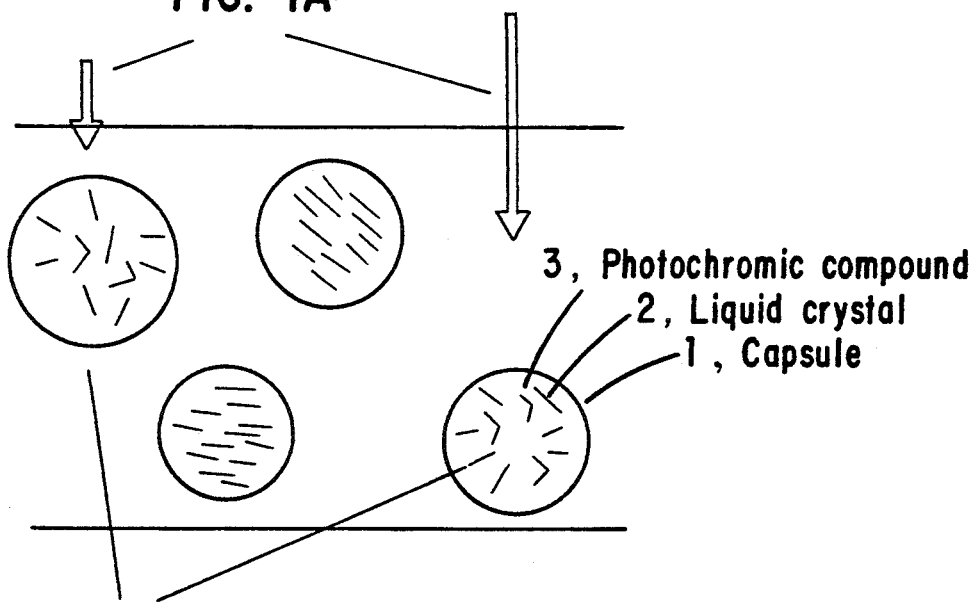

The working mechanism of the device of FIG. 1 is explained by referring to FIG. 4(A-B). In FIG. 4(A), while liquid crystal 2 in individual capsules 1 is orientated, since the orientation direction is at random among capsules, incident light is scattered to have the device look white. FIG. 4(B) shows the state with ultraviolet irradiation, in which photochromic compound 3 in capsule 1 in the irradiated area is isomerized to make a structural change to thereby disturb the orientation of liquid crystal molecules. As a result, the composition in the capsule becomes an isotropic liquid whereby the irradiated area becomes transparent.

The device according to method (1') is characterized by its simple structure and ease of preparation.

The working mechanism of the devices according to methods (1") and (2) can also be accounted for by the same description as given above. The device of method (2) is characterized by ease of controlling characteristics of liquid crystals. The device of method (1') is characterized by its simple structure.

The present invention is now illustrated in greater detail with reference to Examples and Application Examples, but it should be understood that the present invention is not deemed to be limited thereto.

EXAMPLE 1

PVA was esterified with 4-(4,-methoxyphenylazo)-phenoxyacetyl chloride to obtain a polymer in which 5 mol % of the hydroxyl groups thereof were displaced by a 4-(4'-methoxyphenylazo)phenoxyacetato group. Three grams of the polymer was dissolved in 18.0 ml of water, and the aqueous solution was added to a mixed solution of 2.0 g of a nematic liquid crystal ("K-18" produced by BDH Co.; nematic-to-isotropic phase transition temperature: 29° C.) and 1.0 g of methylene chloride. After a small amount of a surface active agent was added, the mixture was stirred at a high speed to prepare an emulsion.

The resulting emulsion was coated on slide glass and dried to obtain an opaque film having a thickness of about 20 μm. Microscopic observation revealed that the liquid crystal capsules dispersed in the film had a diameter of from about 1 to about 7 μm.

When ultraviolet light λ=365 nm) was irradiated onto the film at 27° C. using a mercury lamp and an optical filter, the irradiated area became transparent at once. Then, visible light (λ=525 nm) was irradiated using a xenon lamp and a small-sized spectroscope, whereupon the transparent area returned to its original opaque state. The change between an opaque state and a transparent state could be repeatedly reproduced by alternately irradiating ultraviolet light and visible light.

EXAMPLE 2

To a mixed solution of 2.0 g of a nematic liquid crystal ("K-15" produced by BDH Co.; nematic-to-isotropic phase transition temperature: 35.3° C.), 0.1 g of 4-butyl-4'-methoxyazobenzene, and 1.0 g of methylene chloride was added 20 g of a 15% PVA aqueous solution, followed by stirring at a high speed to prepare an emulsion. The emulsion was coated on slide glass to obtain an opaque film having a thickness of about 20 μm. Microscopic observation revealed that the liquid crystal capsules dispersed in the film had a diameter of from about 1 to about 7 μm.

When ultraviolet light was irradiated on the film at 32° C. using a mercury lamp, the irradiated area became transparent immediately. When, in turn, visible light (λ=525 nm) was irradiated using a xenon lamp, the transparent area returned to its original opaque state. The change between an opaque state and a transparent state could be repeatedly reproduced by alternately irradiating ultraviolet light and visible light.

EXAMPLE 3

A solution of 1.0 g of a nematic liquid crystal "K-15", 1.0 g of 4-butyl-4'-cyanoazobenzene, and 3.0 g of polymethyl methacrylate in 10 g of methylene chloride was coated on slide glass and dried to obtain an opaque film having a thickness of about 30 μm. It was proved by observation under an optical microscope that the liquid crystal was present in a separate phase. When the film was irradiated with ultraviolet light (λ=365 nm) at 35° C. using a mercury lamp, the irradiated area turned immediately to transparent. When visible light (λ=525 nm) was then irradiated by using a xenon lamp, the transparent area returned to opaque. The change between an opaque state and a transparent state could be repeatedly reproduced by alternately irradiating ultraviolet light and visible light.

EXAMPLE 4

To a mixed solution of 2.0 g of a photochromic nematic liquid crystal, 4-octyl-4'-cyanoazobenzene, and 1.0 g of methylene chloride was added 20 g of a 15% PVA aqueous solution, and the mixture was stirred at a high speed to prepare an emulsion. The emulsion was coated on slide glass and dried to obtain an opaque film having a thickness of about 20 μm. Microscope observation proved that the liquid crystal capsules dispersed in the film had a diameter of from about 1 to about 10 μm. When the film was irradiated with ultraviolet light (λ=365 nm) at 50° C. using a mercury lamp, the irradiated area became transparent all at once. Then, visible light (λ=525 nm) was irradiated using a xenon lamp whereby transparent area returned to its original opaque state. The change between an opaque state and a transparent state could be repeatedly reproduced by alternately irradiating ultraviolet light and visible light.

APPLICATION EXAMPLE 1

Application to Electric White Board

Figure 5:
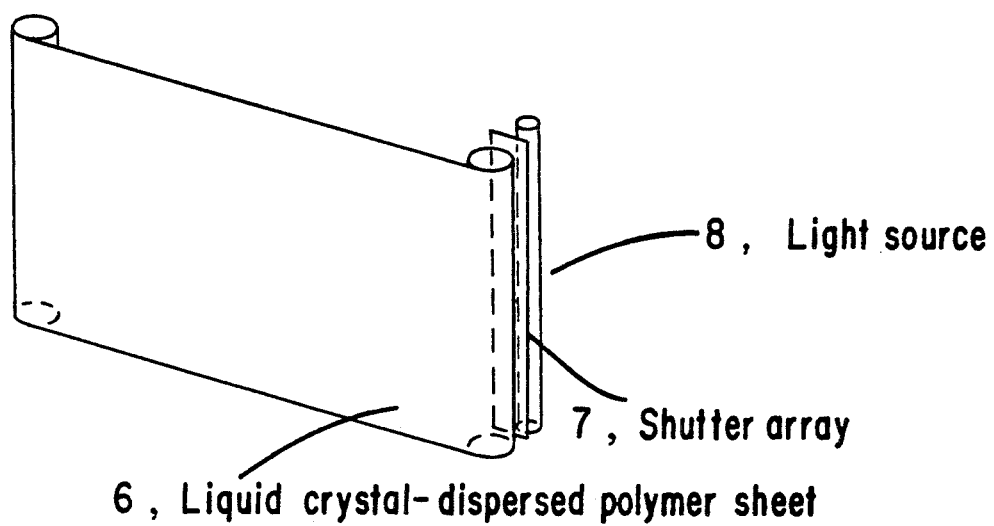
FIGS. 5 and 8 each illustrate a method for displaying by using the display device of the present invention.

FIG. 5 shows a white board display using the display device of the present invention.

Figure 6:
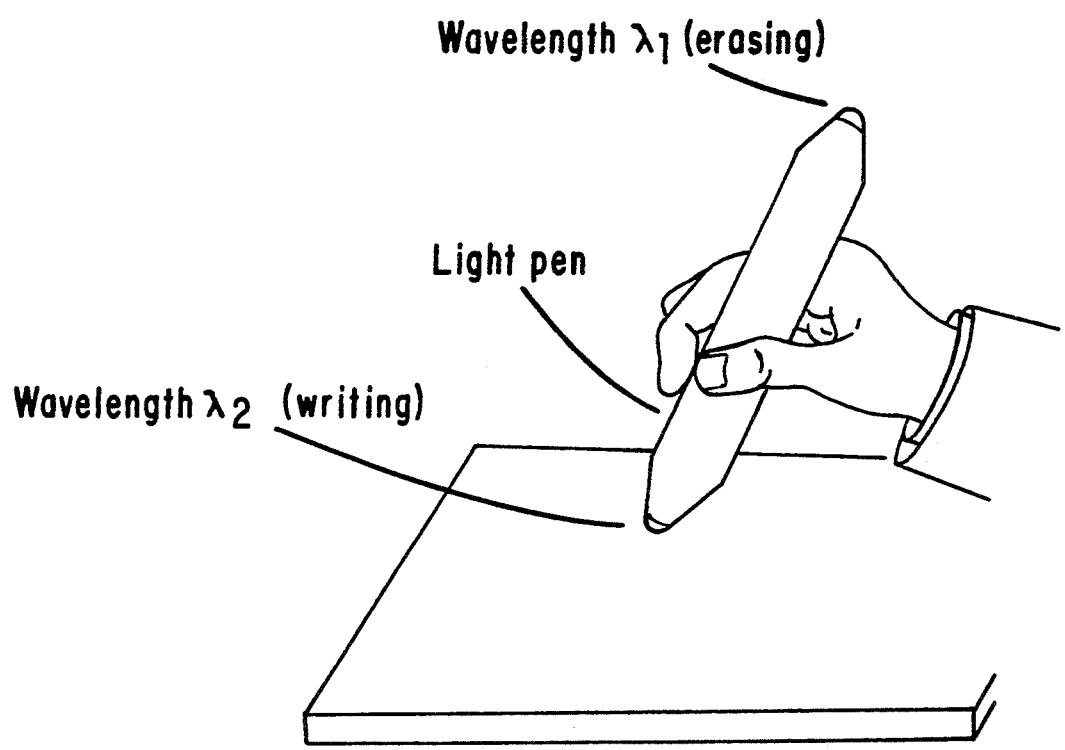
FIGS. 6 and 7 each show an auxiliary tool for achieving displaying.

Sheet 6 prepared by using the liquid crystal-dispersed polymer of the present invention is imagewise exposed to light from light source 8 through shutter array 7 while being moved by a drive (not shown) Optical writing may be directly carried with an image scanner Further, optical writing and erasion may be manually done with a light pen as shown in FIG. 6.

The shutter array of FIG. 5 and the light pen of FIG. 6 are equipped with a heating means so that the sheet is given light while being heated at about 45° to 55° C. An image is formed on irradiation of ultraviolet light ($λ_1$), while the image is erased on irradiation of visible light ($λ_2$).

Thus, application of the present invention accomplishes a wide and flat panel display without using electrical wiring, such as matrix addressing.

APPLICATION EXAMPLE 2

Application to Re-writable OHP Sheet or Paper

Figure 7:
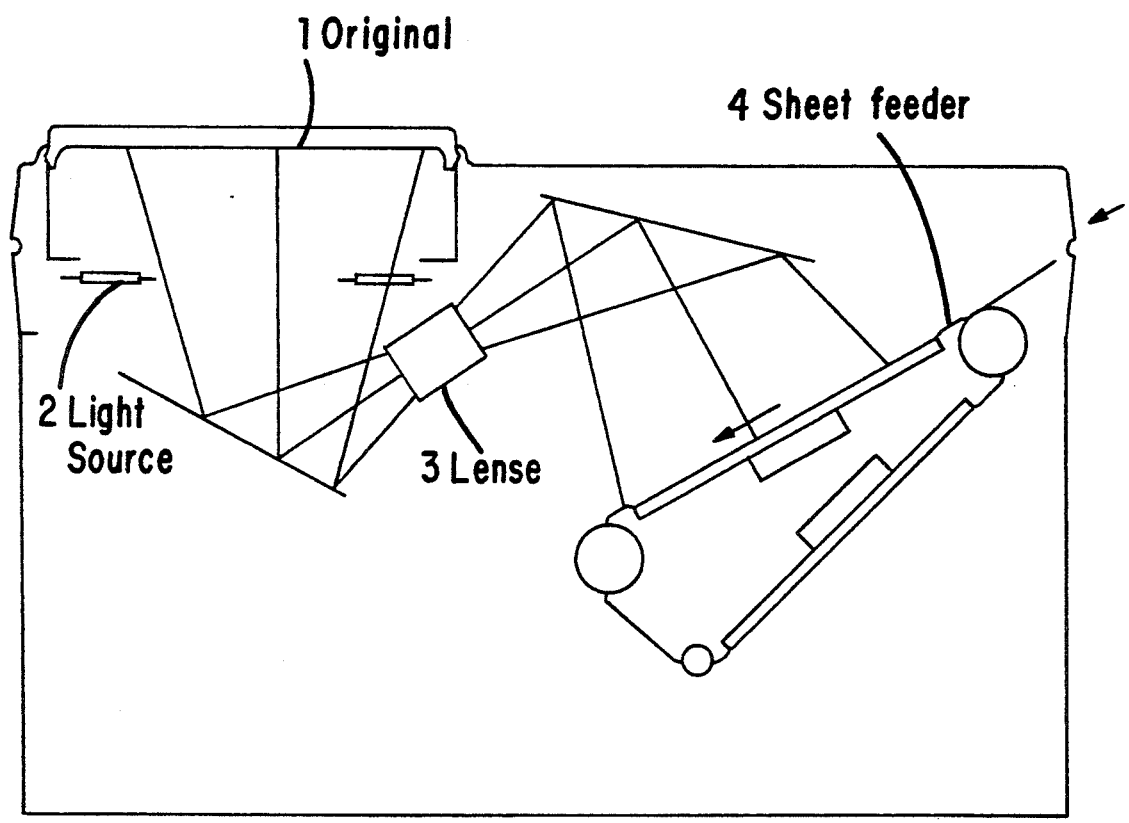

In the case of OHP, a liquid crystal-dispersed polymer sheet which becomes transparent in ultraviolet-irradiated areas and opaque in non-irradiated areas or vise versa is employed as such. Since the temperature of the glass surface of an OHP projector is elevated, a liquid crystal having a high phase transition temperature (70° C. or higher) should be chosen. In the case of re-writable paper, a sheet of black paper is set on the reverse side. An original can be directly copied by using a writing apparatus as shown in FIG. 7. Optical writing and erasion can also be performed with the light pen of FIG. 6.

A mechanism of obtaining a projected image on an OHP sheet is explained below. In the initial state, the whole sheet is in a light scattering state and looks black on an OHP. On irradiation of light of specific wavelength (ultraviolet light), the irradiated area becomes transparent by an optical reaction of the photochromic compound. Thus, an image area remains in a light scattering state, while the background becomes transparent. The image is erased by irradiating visible light of specific wavelength while applying heat (e.g., at 70° C.), whereby the photochromic compound undergoes an optical reaction, and the sheet returns to its original state. If the sheet is exposed to usual lighting or used in an OHP without heat application, the display does not change. Accordingly, the OHP sheet using the present invention can be repeatedly used to provide a great economical advantage.

APPLICATION EXAMPLE 3

Application to Desk Mat Type Display

Figure 8:
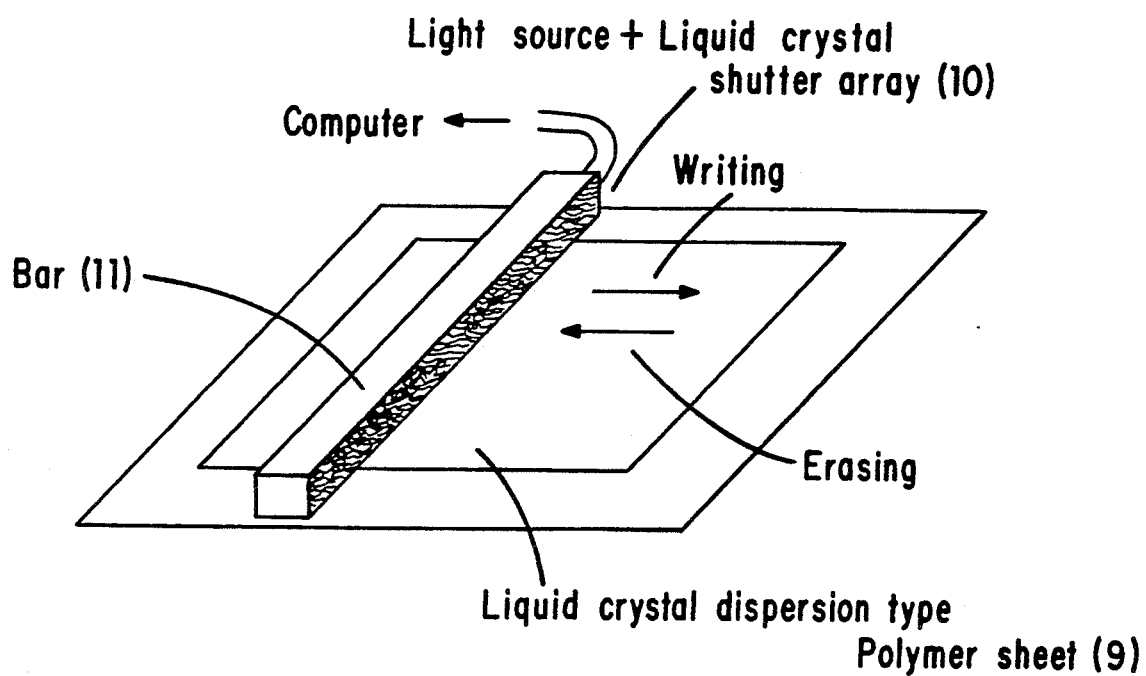

FIG. 8 illustrates a desk mat type display to which the present invention is applied. An image is displayed on desk mat sheet 9 in agreement with output signals from a computer. Shutter array 10 is used for optical writing. Optical writing and erasion is carried out by scanning with bar 11 having a shutter array.

An image signal can also be put in directly from an image scanner. It is also possible to conduct writing and erasion by means of the light pen of FIG. 6.

The displays of Application Examples 1 and 3 are also applicable to writing and erasion according to a matrix addressing system. In this case, too, a light pen may be used for writing and erasion.

As described above, the present invention makes it feasible to produce a display of simple structure which is of reflection type and has a memory effect by combining a polymer dispersed type liquid crystal and a photochromic compound, accomplishing a wide area display, a re-writable OHP sheet, a paper-like display, and the like.

While the invention has been described in detail and with reference to specific examples thereof, it will be apparent to one skilled in the art that various changes and modifications can be made therein without departing from the spirit and scope thereof.

What is claimed is:

1. An optical modulation display device comprising a polymer matrix in which a liquid crystal composition containing a photochromic compound is dispersed.

2. An optical modulation display device as claimed in claim 1, wherein said liquid crystal composition is a mixture of a photochromic compound and a liquid crystal compound.

3. An optical modulation display device as claimed in claim 1, wherein said liquid crystal composition is a composition containing a photochromic liquid crystal compound.

4. An optical modulation display device as claimed in claim 1, wherein the polymer in the polymer matrix is water soluble.

5. An optical modulation display device as claimed in claim 4, wherein the polymer is selected from the group consisting of polyvinyl alcohol, cellulose and polyvinyl pyrrolidone.

6. An optical modulation display device as claimed in claim 1, wherein the liquid crystal composition is comprised of a compound selected from the group consisting of a bisphenol compound, a phenyl benzoate compound, a cyclohexylbenzene compound, an azoxybenzene compound, an azobenzene compound, an azomethine compound, a terphenyl compound, a bephenyl benzoate compound a cyclohexylbiphenyl compound, a phenylpyrimidine compound, a cyclohexylpyrimidine compound, and a cholesterol compound.

7. An optical modulation display device as claimed in claim 1, wherein the amount of the photochromic compound ranges from 0.01 to 50% by weight.

8. An optical modulation display device as claimed in claim 7, wherein the amount of the photochromic compound ranges from 1 to 20% by weight.

9. An optical modulation display device as claimed in claim 1, wherein the photochromic compound is selected from the group consisting of an azobenzene compound, is spiropyran compound, a spirooxazine compound, a triarylmethane compound, a flugide compound, a stilbene compound, an indigo compound, a polycyclic aromatic compound, a viologen compound and a diarylethene compound.

10. An optical modulation display device comprising a photochromic polymer matrix in which a liquid crystal composition is dispersed.

11. An optical modulation display device as claimed in claim 10, wherein said photochromic polymer matrix is a water-soluble polymer to which a photochromic compound is chemically bound.

12. An optical modulation display device as claimed in claim 10, wherein the polymer of the photochromic polymer matrix is water soluble.

13. An optical modulation display device as claimed in claim 12, wherein the polymer is selected from the group consisting of polyvinyl alcohol, cellulose and polyvinyl pyrrolidone.

14. An optical modulation display device as claimed in claim 10, wherein the liquid crystal composition is comprised of a compound selected from the group consisting of a bisphenol compound, a phenyl benzoate compound, a cyclohexylbenzene compound, an azoxybenzene compound, an azobenzene compound, an azomethine compound, a terphenyl compound, a biphenyl benzoate compound, a cyclohexylbiphenyl compound, a phenylpyrimidine compound, a cyclohexylpyrimidine compound, and a cholesterol compound.

15. An optical modulation display device as claimed in claim 10, wherein the photochromic compound is selected from the group consisting of an azobenzene compound, a spiropyran compound, a spirooxazine compound, a triarylmethane compound, a flugide compound, a stilbene compound, an indigo compound, a polycyclic aromatic compound, a viologen compound and a diarylethene compound.

16. A method for displaying which comprises providing an optical modulation display device which comprises a polymer matrix in which a liquid crystal composition containing a photochromic compound is dispersed, and displaying an image on said display device.

17. A method for displaying which comprises providing an optical modulation display device which comprises a photochromic polymer matrix in which a liquid crystal composition is dispersed, and displaying an image on said display device.

* * * * *

UNITED STATES PATENT AND TRADEMARK OFFICE
CERTIFICATE OF CORRECTION

PATENT NO.   :   5,155,607
DATED        :   October 13, 1992
INVENTOR(S)  :   Akinori Inoue et al.

It is certified that error appears in the above-identified patent and that said Letters Patent is hereby corrected as shown below:

Claim 6, column 10, line 68, change "bephenyl" to --biphenyl--.

Column 11, line 1, after "compound" (first occurrence) insert --,--.

Claim 9, column 11, line 14, change "is" to --a--.

Signed and Sealed this

Twenty-sixth Day of October, 1993

Attest:

BRUCE LEHMAN

Attesting Officer

Commissioner of Patents and Trademarks